May 4, 1965 H. E. NIMKE ETAL 3,181,421

VISUAL AND AUDIO PRESENTATION SYSTEM

Filed Jan. 29, 1962 3 Sheets-Sheet 1

INVENTOR.
HELMUT E. NIMKE
ARTHUR M. WAGNER
BY Amster & Levy
ATTORNEYS

May 4, 1965 H. E. NIMKE ETAL 3,181,421

VISUAL AND AUDIO PRESENTATION SYSTEM

Filed Jan. 29, 1962 3 Sheets-Sheet 2

VISUAL AND AUDIO PRESENTATION SYSTEM

Filed Jan. 29, 1962

INVENTOR.
HELMUT E. NIMKE
ARTHUR M. WAGNER
BY
Ametez + Levy
ATTORNEYS

United States Patent Office 3,181,421
Patented May 4, 1965

3,181,421
VISUAL AND AUDIO PRESENTATION SYSTEM
Helmut E. Nimke, Brooklyn, and Arthur M. Wagner, New York, N.Y., assignors, by mesne assignments, to Impcomation, Inc., a corporation of Delaware
Filed Jan. 29, 1962, Ser. No. 169,254
9 Claims. (Cl. 88—28)

The present invention relates generally to a visual and audio presentation system, and in particular to a programming control for integrating the projection of a film and the playback of a magnetic tape.

Various systems have been suggested for providing a coordinated audio program, usually pre-recorded on a magnetic tape of the type suitable for playback in a tape recorder, with a visual presentation from projectors, suitable for either projecting a series of slides or a motion film. In such systems, the tape recorder is usually placed into operation at the start of the projector and the tape is pre-recorded to provide the desired audio program concurrent with the visual presentation. Inherently, such systems do not exhibit the requisite versatility and flexibility to find widespread application in audio-visual selling, training, and teaching aids, which are gaining widespread popularity, both at the commercial and educational levels.

Broadly, it is an object of the present invention to provide a control system for integrating the projection of a film and the playback of an audio recording. Specifically, it is within the contemplation of the present invention to provide a coordinated and predetermined sequence of audio-visual presentation which may be programmed and controlled from the visual medium (i.e., a continuous film strip) and the audio medium (i.e., a magnetic recording tape).

In accordance with an illustrative embodiment demonstrating objects and features of the present invention, there is a tape recorder which is adapted to play-back a tape and includes a recorder motor for initiating a tape-playing interval and a recorder power supply therefor and a film projector which is adapted to project the film and includes a projector motor for initiating a film-projecting interval and a projector power supply therefor. Tape-sensing means are adapted to monitor the tape and provide a tape-controlled signal and film-sensing means are adapted to monitor the film and provide a film-controlled signal. A suitable control system is arranged to receive the tape-controlled and film-controlled signals, respectively, for coordinating tape-playing and film-projecting intervals.

As a feature of the invention, the control system may be arranged for a mode of operation to provide for a continuous visual presentation incident to uninterrupted operation of the projector, with the periodic integration of an audio presentation concurrent with such continuous visual presentation.

As a further feature of the invention, the control system may be arranged to not only initiate the audio presentation, but also to concurrently stop the motion of the projector and provide a relatively stationary visual presentation. With this further mode of operation, it is possible to project a chart, graph, drawing, or the like, on to a screen for a predetermined time interval during which a corresponding audio message may be played; and at the end of such audio message, to once again place the projector into operation for continued visual presentation until such time as a further audio playback is desired, at which time the projector is once again stopped to provide a further relatively stationary visual presentation.

Although only two modes of operation will be described for the illustrative control system, it will be appreciated that the principles disclosed herein will find application in the establishment of other audio-visual sequences and modes, and others which will occur to those skilled in the art, the invention contemplates a relatively simple means for initially programming or cueing the film and the tape to derive the tape-controlled and film-controlled signals respectively. As to the film, it is possible to derive the tape-controlled signals by the simple expedient of notching the edge of the film outwardly of the sprocket holes or by opening adjacent sprocket holes to make an elongated slot at the edge of the film and sensing the occurrence of such notches or slots by a movable film-controlled switch. As to the tape, successive tape-controlled signals may be obtained by adhering electrically conductive segments to the tape and employing such electrically conductive segments to complete a circuit as the segment passes a pair of spaced stationary contacts.

The above description, as well as further objects, features, and advantages of the present invention, will be more fully appreciated by reference to the following detailed description of a presently preferred, but nonetheless illustrative embodiment of the invention, when taken in conjunction with the accompanying drawings, wherein.

Figure 1:
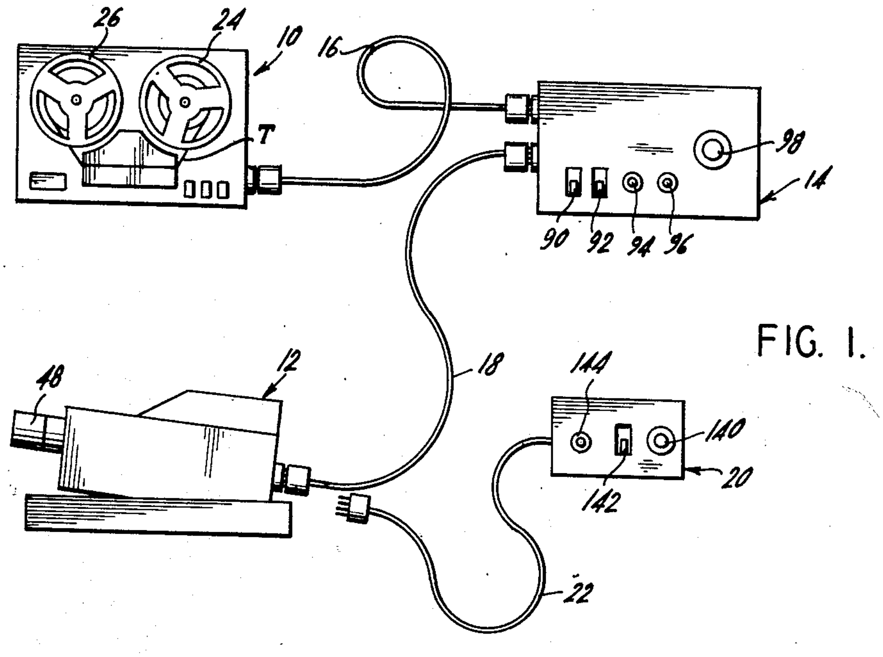
FIG. 1 is a diagrammatic showing of an audio-visual system in accordance with the present invention, which embodies a conventional tape recorder, a continuous film projector, a control system, and, optionally, a remote hand control.

Referring now specifically to the drawings, there is shown in FIG. 1 a typical but nonetheless illustrative audio-visual system in accordance with the present invention which comprises a tape recorder reproducer 10, a projector 12, a programming control 14, a first multi-wire control cable 16 electrically connected between the tape recorder 10 and the programming control 14, and a second multi-wire control cable 18 electrically connected between the projector 12 and the programming control 14. In a typical commercial package, there is also provided a remote hand control 20 which may be electrically connected via the multi-wire cable 22 to the projector 12 for the selective operation of the projector, exclusive of the tape recorder 10 and of the programming control 14.

The tape recorder 10, which is of conventional construction, will be described only insofar as it is necessary for an understanding of the present invention. With minor modifications, virtually any commercially available tape recorder may be integrated into the present system. Specifically, the tape recorder 10 incorporates a transport mechanism (not shown), which is suitable for advancing and rewinding a magnetic tape T between the supply and take-up reels 24, 26. As seen in the diagrammatic showing of FIG. 2, the tape recorder 10 includes a recorder motor 28 connected at one side to an internal power supply 30 and via the internal circuit elements 32 of the conventional recorder to one motor terminal or plug-in 34. The other side of the recorder motor 28 is connected directly to another motor terminal or plug-in 36. Internally of the tape recorder 10, there is provided a bypass switch 38 which is connected across the motor terminals 34, 36. With the bypass switch 38 closed, the tape recorder 10 can be operated in the normal fashion;

and with the bypass switch 38 open, the tape recorder is conditioned for remote operation from the programming control 14, as will be subsequently described. Further, the tape recorder is provided with two spaced stationary tape contacts 40, 42, which may be fabricated of a springy electrically conductive material and are positioned along the traverse path of the tape T to contact the same and sense the movement of successive conductive segments or strips S to a predetermined signalling location. The leading stationary contact 40 is electrically connected by an appropriate lead to a grounded signal terminal 44, while the spaced trailing stationary contact 42 is electrically connected by an appropriate lead to a signal terminal 46. When the conductive strip or segment S bridges the tape contacts 40, 42, the signal terminals 44, 46 will be electrically connected to each other and to ground and completes a circuit in the remote programming control 14 for a control function, as will subsequently be described. The conductive strips or segments S are adhered or otherwise secured or applied to the magnetic tape T between successive messages, which may be of any duration within the limits imposed by the physical length of the tape and as determined by the programmed material. It will be appreciated that the pre-recording of a magnetic tape and the placement thereon of successive signalling strips or segment S merely involves conventional recording techniques, with the securement of conductive segments S of the lengths somewhat greater than the spacing between the leading and trailing tape contact 40, 42, in any convenient fashion.

Figure 2:
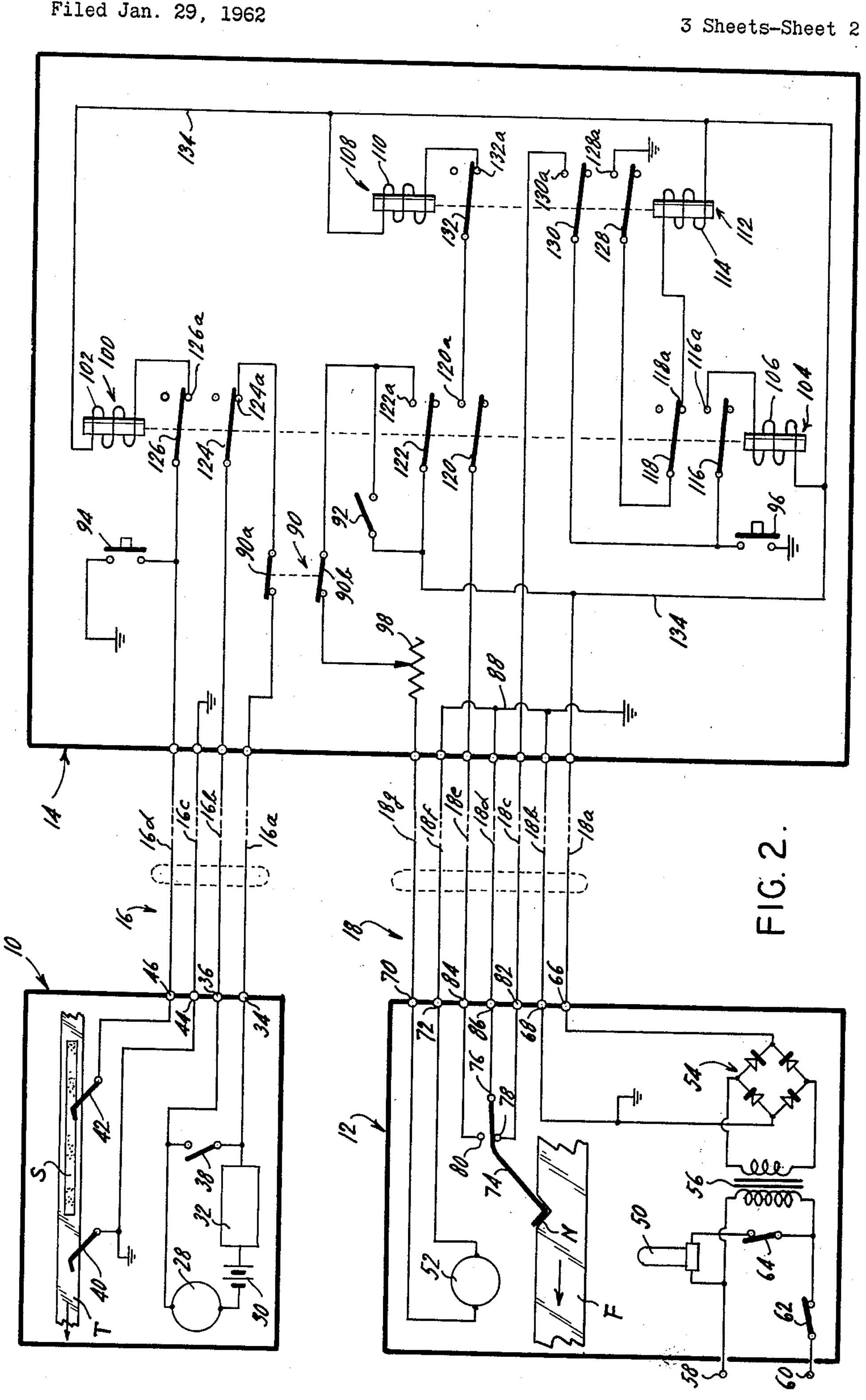
FIG. 2 is a schematic and diagrammatic showing of the audio-visual system shown in FIG. 1.

The projector 12 is substantially of conventional construction and includes a film transport mechanism (not shown) arranged to move a film strip S in a continuous fashion passed through an optical projection system 48 which includes a projection lamp 50 (see FIG. 2). The transport mechanism is driven by a projector motor 52. Internally of the projector 12, there is provided a D.C. power supply 54 in the form of full-wave bridge rectifier which has its input terminals connected to the secondary of a power transformer 56, the primary of which is connected to A.C. input terminals 58, 60. A main control switch 62 is provided in one side of the A.C. line to provide an on-off control for the projector 12. The projection lamp 50 is connected across the A.C. lines 58, 60 with a separate lamp switch 64 being provided for the separate energization of the projection lamp 50 from the A.C. lines. The output terminals of the full-wave bridge rectifier 54 are connected by appropriate leads to power terminals or plug-ins 66, 68. These power terminals are connected via the wire 18*a*, 18*b* the cable 18 to the programming control 14 for supplying power to the control. Further the power terminals are connected via the programming control 14 to the projector motor 52 over further leads 18*g*, 18*f* of the multi-wire cable 18.

The projector 12 is provided with a movable film-controlled switch 74 which is positioned along the film transport path and is constructed to normally ride along an edge of the film F. The switch 74 has a pivotal mount 76 and is movable between selective positions in contact with a signal contact 78 and a reset contact 80. In the illustrative position of FIG. 2, the film-controlled switch 74 is engaged within a signalling notch N in the adjacent edge of the film F and provides an electrical connection from the signal contact 78 to ground. The signal and reset contacts 78, 80 respectively are connected to signal terminals or plug-ins 82, 84, while the movable film-controlled switch 74 is connected to a ground terminal 86, which is grounded along with the motor terminal 72 and the grounded power terminal 68 via a common ground lead 88. Notches N are intermittently provided along the edge of the film F and located at points in the visual presentation where it is desired to initiate a tape-playing interval, with or without stopping the visual presentation. At such time as the film F is advanced to displace the notch N away from the film-controlled switch 74 along the film transport path, the switch 74 rides up to disconnect the signal terminal 78 from ground and to connect the reset contact 80 to ground.

Referring to FIG. 1, the programming control 14 includes a double-pole single throw control switch 90, a manual mode or by-pass switch 92, control-conditioning push switches 94, 96, and a projector motor speed-control potentiometer or rheostat 98. Further, and as seen specifically in FIG. 2, the programming control 14 further includes a tape-signal relay 100 having an energization coil 102, a film-signal relay 104 having an energization coil 106, a film-signal reset relay 108 having an energization coil 110, and a film-signal lockout relay 112 having an energization coil 114. The relays 100, 104, 108, and 112, are of the latching type and incorporate internal mechanical means (not shown) for holding their respective contacts in one or the other position of adjustment when once energized. More particularly, the tape-signal relay 100 and the film-signal relay 104 are arranged in opposing relation with respect to a common bank of contacts such that the contacts will be thrown into one position upon energization of the coil 102, and will remain in the one position despite the interruption of the energization circuit to the coil 102 until such time as the coil 104 of the opposing relay 106 is energized. Similarly, the film-signal reset relay 108 is arranged in opposing relation to the film-signal lockout relay 112 and controls a common set of contacts. Specifically, the opposed relay pair 100, 104 controls a bank of six contacts, respectively designated by the numerals 116, 118, 120, 122, 124, and 126. The opposed relay pair 108, 112 controls three contacts, respectively designated by the numerals 128, 130, 132.

One side of the energization coils 102, 106, 110, and 114 of the opposed relay pairs 100, 104, and 108, 112 are connected to a common D.C. line 134 which is connected to the positive output terminal of the D.C. power supply 54 via wire 18*a* of the multi-wire plug-in cable 18. The other side of the respective energization coils are connected via one or more relay contacts and switches to the respective signal terminals of the tape recorder 10 and of the projector 12 for achieving the coordinated control functions in response to the sensing of signals from the tape T and the film F by the tape-sensing contacts 40, 42 and the film-sensing switch 74. Specifically, the energization coil 102 of the tape-signal relay 100, is connected via the contact terminal 126*a* and the contact 126 to the the wire 16*d* of the multi-wire cable 16 and to the signal terminal 46. When a conductive segment or strip S electrically bridges the tape contacts 40, 42, this circuit is completed to ground from the signal terminal 46 via the trailing contact 42, the conductive strip S, the leading contact 40, the signal terminal 44, and the wire 16*c* of the cable 16. A by-pass from the contact 126 to ground is provided by the push-button switch 94, which push-button switch may be depressed to condition the programming control 14 to initially set up the control for starting a particular audio-visual presentation in response to the sensing of the notch N on the film F in the projector by the film-controlled switch 74.

The energization circuit for the recorder motor 28 is completed within the program control 14 from the motor terminal 34 over the wire 16*a* of the cable 16, the pole 90*a* of the double-pole single throw control switch 90, the contact terminal 124*a*, the contact 124, and the wire 16*b* of the cable 16 connected to the motor terminal 36. Energization of the recorder motor 28 will occur when the main control switch 90 is closed and when the contact 124 engages the contact terminal 124*a*.

The energization circuit for the projector motor 52 is completed within the programming control 14 from the motor terminal 70 via the wire 18*g* of the cable 18, the speed control rheostat 98, the closed pole or blade 90*b* of the main control switch 90, the contact terminal 122*a*, and the contact 122 which in turn is connected to the positive line 134 of the D.C. power supply. The other motor terminal 72 is grounded via the common ground connection or lead 88. When the contact 126 engages the contact terminal 126a to complete the energization circuit for the recorder motor 28, the contact 122 is out of contact with the contact terminal 122a and thereby disrupts the energization circuit for the projector motor 52.

The by-pass or mode switch 92 is connected in parallel with the contact 122 and the contact terminal 122a to provide an alternate energization circuit for the projector motor 52 at such time when the control system is to operate in a mode where the projector motor 52 is continuously energized, as will subsequently be described.

The energization circuit for the film-signal reset relay coil 110 is made via the contact terminal 132a, the contact 132, the contact terminal 120a, the contact 120, the wire 18e of the cable 18, the signal terminal 84, the reset contact 80, and the film-controlled switch 74 which is grounded via the ground terminal 86, the wire 18d of the cable 18, and the common ground lead 88. The completion of this circuit requires the movement of the film-controlled switch 74 to a position along the edge of the film F incident to drive of the projector 12, and switching of the contact 120 into engagement with the contact terminal 120a, as will be subsequently described.

The energization circuit for the coil 106 of the film-signal relay 104, is provided over the contact terminal 116a, the contact 116, the contact 130, the contact terminal 130a, the wire 18c of the cable 18, the signal terminal 82, the signal contact 78, the film-controlled switch 74, and the grounded terminal 86. This circuit is only completed when a notch N is being sensed in the film F by the movable film-controlled switch 74, when the contact 116 is switched into engagement with the contact terminal 116a, and when the contact 130 is switched into contact with the contact terminal 130a. The push-button switch 96 by-passes the contact 130 and the signal contact 78 to complete the energization circuit for the coil 106 of the film-signal relay 104 when the contact 116 is in engagement with the contact terminal 116a to initially set up the programming control 14 to initiate an audio-visual presentation under the control of the magnetic tape T and the bridging of the contacts 40, 42 by the conductive strip S, which is the illustrative condition of the circuit in FIG. 2.

Finally the energization circuit for the film-signal lockout coil 114 is completed over the contact terminal 118a, the movable contact 118, the movable contact 128, and the contact terminal 128a.

As previously described, the programming control 14 is arranged to provide two modes of integrated audio-visual operation. In a first mode, herein designated as Mode 1, the film projector 12 is in continuous operation such that as the film F moves in relation to the sensing switch 74, appropriately placed notches N will complete a circuit over the signal contact 78 and via the several relays will initiate a tape-playing interval, when the tape-playing interval is ended, the conductive strip or segment S will signal the end of the audio presentation and will restore the tape recorder 10 to its non-playing condition until signaled to playback the next recorded segment of the tape T incident to the sensing of a further notch on the film F by the film-controlled switch 74.

A further mode of operation which may be achieved in accordance with the programming control 14, herein designated as Mode 2, utilizes the signal derived from the film F not only to initiate a tape-playing interval, but also to stop the film F thereby to provide a stationary visual presentation to the observer, such as of a chart, graph, drawing or the like, which then may be described in the initiated audio presentation. The signal derived at the end of the tape-playing interval by the bridging of the contacts 40, 42 by the next successive conductive strip S, disrupts the operation of the tape recorder 10 and once again places the projector 12 into operation until the next notch on the film F is sensed by the film-controlled switch 74.

Since the bypass or mode-control switch 92 is shown in its open position corresponding to Mode 2 operation in the illustrative showing of FIG. 2, there follows a detailed explanation of the operation of our improved audio-visual control in Mode 2 operation:

The schematic showing of FIG. 2, in addition to being arranged for Mode 2 operation, is shown with all of the relay contacts in position to receive a film-controlled signal at the signal terminal 46 incident to bridging of the leading and trailing contacts 40, 42, by the conductive strip S. It will be appreciated that the recorder motor 28 is energized in that its energization circuit is completed via the closed contact 90a and the contact pair 124, 124a. Conversely, the projector motor 52 receives no power since its energization circuit has not been completed since the contact pair 122, 122a is open.

When the conductive strip S on the magnetic tape makes a momentary contact between the spaced contacts 40, 42, an energization circuit is completed for the tape-signal relay coil 102 via the contact pair 126, 126a. Although the bridging of the contacts 40, 42, is only momentary, since the conductive strip S will override in the direction of tape feed, as indicated by the directional arrow, the energization is sufficient to switch the contacts 116, 118, 120, 122, 124, and 126 to their respective other contact terminals. Due to the internal mechanical latching of the relays, these new contact positions will be maintained until the opposing coil 106 of the film-signal relay 104 is energized.

Upon completion of the contact pair 122, 122a, the energization circuit for the projector motor 52 is completed to place the projector 10 in operation at a speed determined by the setting of the potentiometer or rheostat 98. Switching and opening of the contact pair 124, 124a concurrently disrupts the energization circuit for the recorder motor 28. It should be noted that the conductive strip S has over-ride such that the tape T stops in a position for playback of the next audio presentation program on the tape T.

Contact pair 116, 116a is closed to condition the film-signal relay 104 for energization of the coil 106 upon closing of the contact pair 130, 130a. Also, contact pair 120, 120a is closed to condition the film-signal reset relay 108 for energization of the coil 110 thereof.

As soon as the projector motor 52 begins the film transport, the film-controlled switch 74 rides out of the slot N on to the adjacent edge of the film strip S to break the contact between the switch 74 and the signal terminal 78 and to make the contact between the switch 74 and the reset contact 80. This completes an energization circuit for the film-signal reset relay 108 via the closed contact pair 120, 120a, and the contact pair 132, 132a, whereupon the bank of contacts 128, 130, 132, shift to their opposite positions and are locked into place. Simultaneously, this opens the contact pair 132, 132a to disrupt the energization circuit for the coil 110 of the film-signal reset relay 108.

Contact pair 128, 128a is closed to condition a series circuit with the open contact pair 118, 118a in the energization circuit for the film-signal lockout relay coil 114. Further, contact pair 130, 130a is closed to establish a series circuit with closed contact pair 116, 116a in the energization circuit for the film-signal coil 106, it being noted however that this energization circuit is not completed in that an open circuit exists between the film-controlled switch 74 and the signal terminal 78.

Film transport will continue under control of the energized projector motor 52 until such time as the next successive notch N advances into a position wherein it is sensed by the film-controlled switch 74 which disrupts the contact pair 74, 80, and reestablishes the contact pair 74, 78. This completes a series circuit through closed contact pair 130, 130a and closed contact pair 116, 116a to complete the energization circuit for the coil 106 of the film-signal relay 104 which will shift the contacts 116, 118, 120, 122, 124, and 126, back to the position illustrated in FIG. 2. Opening of the contact pair 116, 116a, disrupts the energization cricuit for the coil 106 of the film-signal relay 104, but the contacts will remain in the illustrated position due to the mechanical latching feature of the relay. Contact pair 118, 118a closes and energizes the coil 114 of the film-signal lockout coil 112 over previously closed contact pair 128, 128a which in turn will shift the bank of contacts 128, 130, 132 of the opposed relays 108, 112 to the position illustrated in FIG. 2. The opening of contact pair 128, 128a disrupts the energization circuit for the film-signal lockout relay 112, but due to the self-latching feature of the several relays, the contacts will remain in the illustrated position. Contact pair 130, 130a, is opened to open its circuit as a precautionary measure in that the film F may not override sufficiently to advance the notch N beyond the film-controlled switch 74 to open the contact pair 76, 78. Contact pair 132, 132a, is closed and establishes or conditions an energization circuit for the coil 110 of the film-signal reset relay 108, which circuit is further conditioned for operation by the closing of the contact pair 74, 78, either incident to overriding of the film F in relation to the film-controlled switch 74 or in response to the next film-projecting interval.

The contact pair 124, 124a is once again closed to complete the energization circuit for the recorder motor 28 to initiate the playback of the next section of the audio program on the tape T. Contact pair 120, 120a is opened to prevent resetting of the film-signal relay 108 until such time as the tape-playing interval has been completed as indicated by the bridging of the contacts 40, 42 by the next successive conductive strip or segment S. Finally, contact pair 122, 122a is opened to interrupt the energization circuit for the projector motor 52, while contact pair 126, 126a is closed to condition the tape-signal relay 102 in response to the provision of the next controlled signal.

As previously indicated the double-pole, single throw switch 90 serves as a start and stop switch for the recorder motor 28 and for the projector motor 52, while the normally opened push-button switches 94, 96, are employed to set up the relays 100, 104, 108, and 112, in advance of the start of the particular audio-visual program so as to enable the opening of the program with either a tape or film presentation. Closing of the push-button switch 94 will set up the several relays for a film-starting sequence, while closing of the push-button switch 96 will set up the several relays for a tape-starting sequence.

At such time as it may be desired to operate the tape recorder 10 and the projector 12 in Mode 1 operation, it is merely necessary to close the bypass or mode switch 92, which bridges or parallels the contact pair 122, 122a, such as to provide a continuous energization circuit for the projector motor 52 which will not be disrupted by the energization of the tape-signal relay 100. In Mode 1 operation, the film F will move continuously and periodically will signal the tape recorder 10 to initiate a tape-playing interval. At the end of such tape-playing interval, the programming control via the signal derived from the bridging of the contact pair 40, 42, by the conductive strip S, will disrupt the transport of the tape T by opening the energization circuit for the recorder motor 28 until the next successive tape-playing interval is signaled from the projector 12 incident to the sensing of a notch N on the film F and the provision of a tape-controlled signal to the programming control 14.

Figure 3:
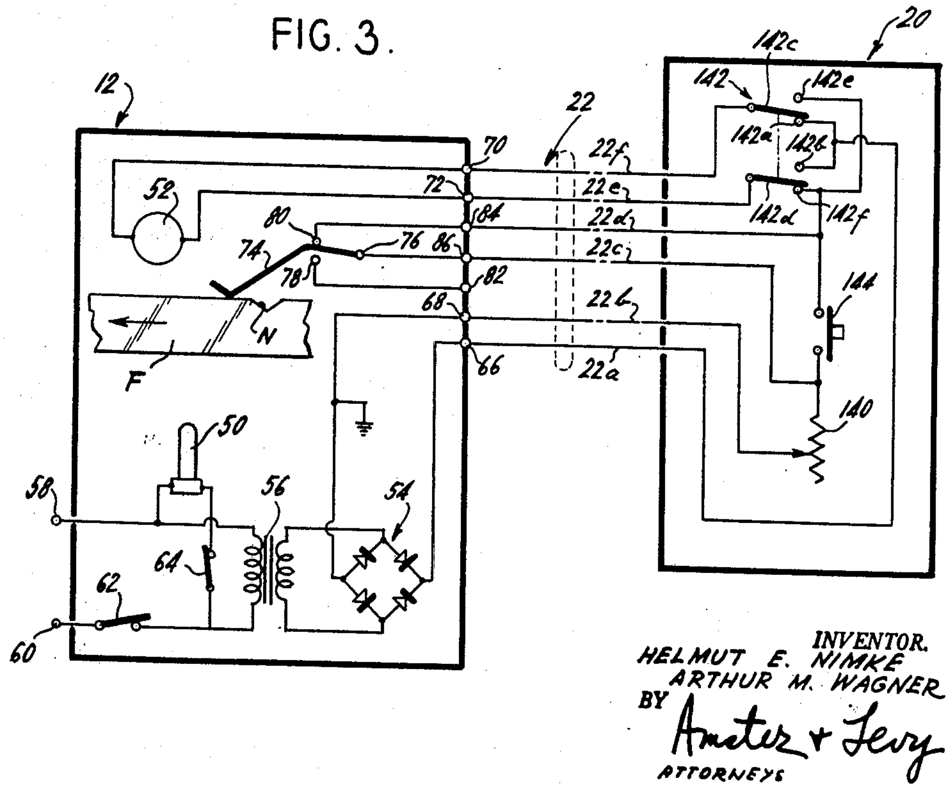
FIG. 3 is a schematic and diagrammatic showing of the projector with the remote hand-control connected thereto for independent operation of the projector exclusive of the tape recorder and the control system.

At such time as it is desired to control the projector 12 remotely and apart from the programming control 14, the connection between the multi-wire cable 18 and the plug-in terminals of the projector 12 may be disrupted and the multiwire cable 22 connected in lieu thereof, as shown in FIG. 3. This connects the remote hand control 20 which is arranged to permit continuous film projection at a presentation rate or speed which may be controlled by a rheostat 140. Further, the direction of film flow may be controlled by a double-pole single-throw switch 142. Still further, an override push-button switch 144 is provided which enables the operator to take over control of the projector from the movable film-controlled switch 74. Specifically, the wire or lead 22a of the multi-wire cable 22 is connected to the positive power terminal 66 of the projector 12 which in turn is connected to the positive output junction of the full-wave bridge rectifier 54. Internally of the remote hand control 20 the wire 22a is connected to the contact terminals 142a, 142b. The contact terminal 142a is connected over the pole 142c of the double-pole switch 142 and via the wire 22f of the cable 22 to one side of the projector motor 52. The opposite side of the projector motor is connected via wire 22e of the cable 22 to the other pole 142d of the double pole-switch 142 and via the contact terminal 142f, the series-connected push button switch 144 and the speed-control rheostat 140 to lead 22b of the cable which is grounded at the opposite terminal of the full-wave rectifier 54. Additional contact terminals 142e, 142f are electrically connected to each other and to the push-button switch 144. It will be appreciated that upon closing of the override push-button switch 144, an energization circuit will be completed for the projector motor 52 over the contact terminals 142a, 142f in the illustrated position of the double-pole single throw switch 142 to cause the projector 12 to move the film in one direction (i.e. forwardly); and upon manual throw of the switch 142 to the position wherein the respective blades 142c, 142d contact the terminals 142e, 142b an energization circuit will be completed for the projector motor 52 to cause film transport in the opposite direction (i.e. rearwardly).

Normally however, the override push-button switch 144 is opened and the respective energization circuits for forward and reverse drive of the transport mechanisms of the projector 12 are provided under control of the film-controlled switch 74 which in turn is selectively actuated by the film F as it passes a sensing location in relation to the switch. The terminal 78 is not electrically connected in the circuit in this mode of operation. However, the terminal 80, which is engaged by the film-controlled switch 74 for so long as the latter rides along the edge of the film F, completes a parallel circuit from the contact terminals 142e, 142f within the hand control 20 through the speed-controlled rheostat 140 and to ground, it being recalled that positive potential is applied from the full-wave bridge rectifier 54 to the contact terminals 142a, 142b. At such time as the film-controlled switch 74 is engaged within the notch N of the film F, this energization circuit will be disrupted and interrupt drive of the film F, either in the forward or reverse direction depending upon the setting of the double-pole switch 142. It will also be appreciated that the double-pole switch 142 may be set in a neutral position out of engagement with either contact terminals 142a, 142b or 142e and 142f to interrupt the energization circuit for the projector motor 52.

A brief description now follows the control of the projector 12 by the remote hand control 20:

Assuming that the illustrated position of the double-pole single-throw switch 142 corresponds to forward drive of the film F in the direction of the directional arrow in FIG. 3, the film F will be transported until the film-controlled switch 74 is engaged in a notch N. At this time, the energization circuit for the projector motor 52 will be disrupted due to opening of the contact pair 76, 80 and there will be projected onto the viewing screen whatever visual information is on the film F at the keyed location. If the operator desires to initiate film transport, the by-pass or override push-button switch 144 is pressed to complete an energization circuit in parallel to the open contact pair 76, 80 which will again reestablish the energization circuit for the projector motor 52 in the forward direction. As soon as the film transport is again initiated, the film-controlled switch 74 will ride out of the notch N to reestablish the closed contact pair 76, 80 and the primary motor circuit and the operator can release the push-button switch 144 to allow control to be exercised by the next film stop signal which is derived by the film-controlled switch 74. Reverse transport of the film F may be achieved by reversing the blades 142*c*, 142*d* to contact the terminals 142*d*, 142*b* respectively; and total override of the film-controlled switch 74 may be attained by maintaining the by-pass or override push-button switch 144 in its closed condition.

From the foregoing, it will be appreciated that there has been provided in accordance with the present invention an audio-visual presentation system which is capable of providing continuous or frame by frame presentation of visual media, with the coordinated playback of sound. The establishment of the interrelationship between the audio and visual material is a relatively simple matter and a high order of flexibility and versatility in the interrelation of the material is possible due to the exceptionally expedient means for deriving tape-controlled and film-controlled signals respectively. A number of useful modes of control have been disclosed and described and others will occur to those skilled in the art. In its overall aspects, the present system lends itself admirably to a wide variety of practical applications in the audio-visual field and provides a very effective system for preparing selling, training and teaching aids.

In certain instances, it may be desirable to provide a third mode of operation which operates the tape recorder 10 and the projector 12 in an inter-mode program which automatically mixes Modes 1 and 2. It will be recalled that Mode 1 operation provides for continuous operation of the film projector, the initiation of a tape-playing interval under control of the sensing switch 74 followed by the interruption of the tape playing interval upon derivation of a signal at the end of the audio presentation, and the restoration of the tape recorder to its non-playing condition until a further signal is derived from the film control switch. On the other hand, Mode 2 operation provides a stationary visual presentation to the observer by disrupting drive of the film projector 12, with the initiation of a tape-playing interval. At the end of the tape-playing interval in Mode 2 operation, the tape recorder 10 is disrupted and the projector 12 is once again placed into operation until the derivation of the next film-controlled signal. For an inter-mode programming, as will be described in connection with FIG. 4, the system is placed in Mode 2 operation until a signal is derived which places the system into Mode 1 operation. When the next intermode signal is sensed, the system will be placed into Mode 2 operation until the derivation of the next mode-change signal.

Figure 4:
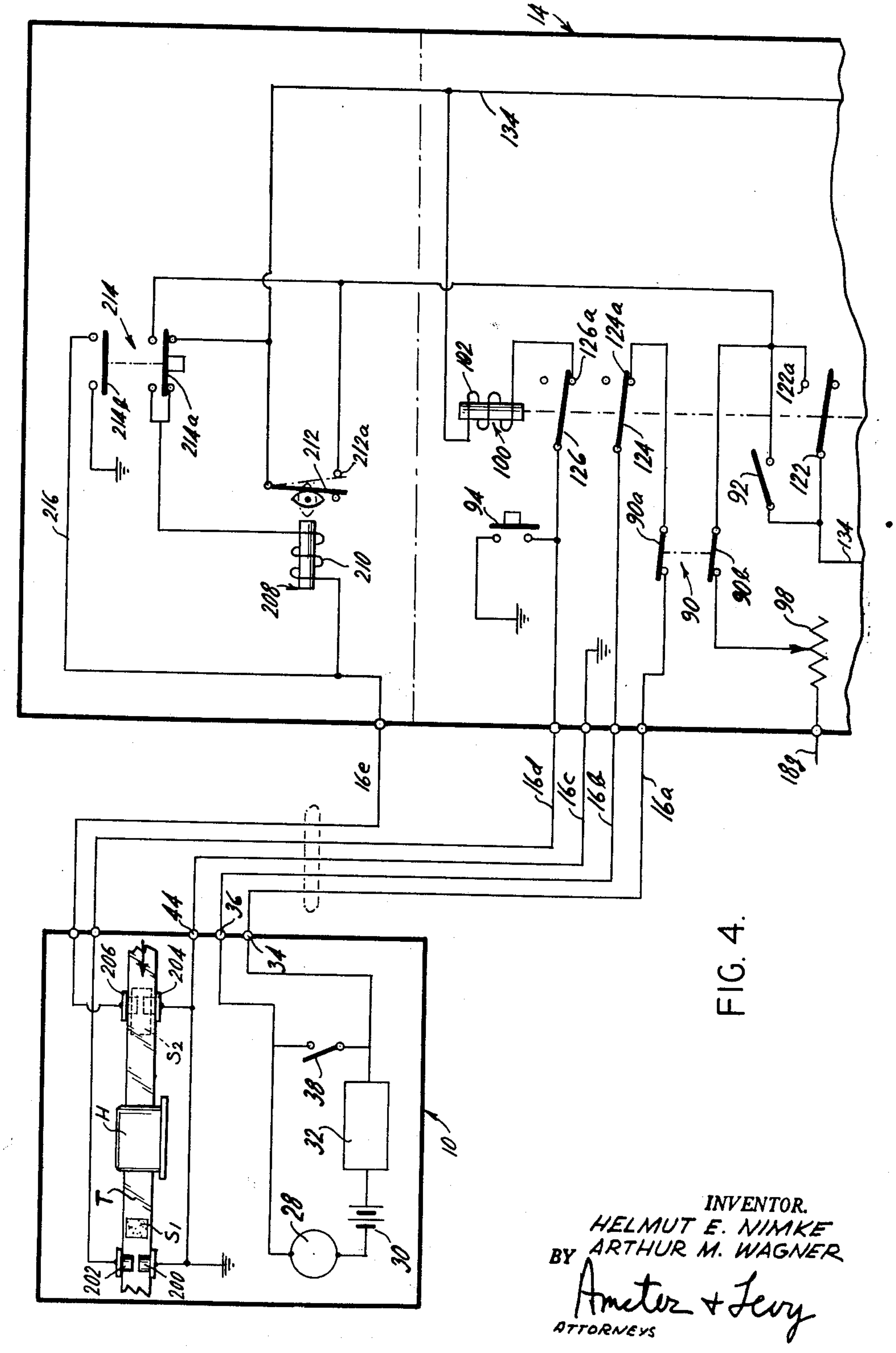
FIG. 4 is a diagrammatic showing of a modified audio-visual system in accordance with the present invention.

Referring now specifically to FIG. 4, the tape recorder 10 is modified to enable the derivation of a main control signal, as previously described, and a further mode-change signal which is employed to establish inter-mode operation in additional circuitry added to the previously described program control 14. In this illustrative embodiment, the main film-controlled signal is derived from a first conductive segment $S_1$ provided on the side or face of the magnetic tape T contiguous to the tape-reading head H. The mode-change signal is derived from a second conductive segment $S_2$ or the like provided on the face or side of the magnetic tape T which is remote from the tape-reading head H. The conductive segment $S_1$ is arranged to bridge and electrically connect the pair of signal posts 200, 202 arranged to contact the front side or face of the magnetic tape T, while the conductive segment $S_2$ is arranged to bridge and electrically connect a pair of signal posts 204, 206 arranged to contact the rear side of the magnetic tape T. The mode-change signal which is derived over the lead 16*e* is employed to complete the energization circuit for the coil 210 of an inter-mode relay 208 which is of the mechanical latch type. The inter-mode relay has a contact pair 212, 212*a* which completes a parallel circuit bypassing the manual mode switch 92 to supply power for the projector motor 52 continuously for Mode 1 operation independent of other control sequences and circuitry. The inter-mode relay 208 will make and break the contact pair 212, 212*a* on alternative pulses applied to its energization coil 210 and the mechanical latch is arranged to hold the contacts opened or closed even after the mode-change signal is disrupted and power is removed from the coil 210.

A double-pole, double-throw momentary contact type of push button switch 214 is provided in the energization circuit of the relay coil 210 to permit resetting of the inter-mode relay 208 into the illustrated position for Mode 2 operation thereby providing the required synchronization for the start of a programming sequence. The push button switch 214 is wired in the circuit such that the relay coil 210 will only be energized when it is required to reset the same for Mode 2 operation. This is accomplished by obtaining the reset power through the relay contact which is energized in Mode 1 operation. As the relay 208 resets, power to the coil 210 is broken by its own contacts, with the other half of the momentary contacts serving to close a ground circuit for the relay 210. Specifically, the push button switch 214 includes a first contact 214*a* connected in the energization circuit for the relay coil 210 between the relay and the contact 212 and a second contact 214*b* which is connected to the other side of the relay coil 208 via lead 216 which is arranged to ground the relay coil.

A brief description now follows of the inter-mode program for the tape recorder 10 and projector 12 with the modified program control shown in FIG. 4:

For such automatic-intermode program, manual mode switch 92 is opened, as is the condition for Mode 2 operation. At the start of any particular program, either the tape recorder 10 or the projector 12 will be running, depending upon the program and whether or not momentary contact switches 94, 96 have been actuated prior to the starting in order to set up a particular program.

In any event, the sound and film program will continue in Mode 2 operation until a conductive tape signal strip $S_2$ on the back of the magnetic tape T advances into a position bridging and closing the gap between the contact pair 204, 206 and thereby completes the energization circuit for the relay 208 to place the programming control into Mode 1 operation. The tape signal strip $S_1$ will advance to complete the main programming control and disrupt energization of the motor 28 in the tape recorder 10. The respective signal segments $S_1$, $S_2$ will of course advance with the tape T to override the respective pairs of signal contact posts.

Mode 1 operation will continue with the film projector 12 running continuously and signalling the magnetic tape T to its "on" condition through the basic relay system as described. Thereupon, the magnetic tape T will stop on its own signals. When the next segment $S_2$ of conductive tape advances to close the energization circuit of the inter-mode relay 208, it will restore the relay to the Mode 2 position as illustrated. The magnetic tape T will stop and the projector 12 will continue to run until the next film signal causes it to stop and the tape recorder 10 to start. The Mode 2 sequence of operation is now restored until a further mode-change signal is derived over the lead 16*e*.

A latitude of modification, change and substitution is intended in the foregoing disclosure and in some instances some features of the invention will be employed without a corresponding use of other features. Accordingly it is appropriate that the appended claims be construed broadly and in a manner consistent with the spirit and scope of the invention therein.

What we claim is:

1. In combination, a tape recorder adapted to playback a tape and including a recorder motor for initiating a tape-playing interval and a recorder power supply for said tape recorder, a film projector adapted to project a film and including a projector motor for initiating a film-projecting interval and a projector power supply for said projector, tape-sensing means adapted to monitor said tape and providing tape-controlled signal, film-sensing means adapted to monitor said film and providing a film-controlled signal, and control means responsive to said tape-controlled and film-controlled signals respectively for coordinating said tape-playing and film-projecting intervals, said control means including means responsive to said film-controlled signal for initiating a tape-playing interval and means responsive to said tape-controlled signal for ending said tape-playing interval.

2. In combination, a tape recorder adapted to playback a tape and including a recorder motor for initiating a tape-playing interval and a recorder power supply for said tape recorder, a film projector adapted to project a film and including a projector motor for initiating a film-projecting interval and a projector power supply for said projector, tape-sensing means adapted to monitor said tape and providing tape-controlled signal, film sensing means adapted to monitor said film and providing a film-controlled signal, and control means responsive to said tape controlled and film-controlled signals respectively for coordinating said tape-playing and film-projecting intervals, said control means including means repsonsive to said film-controlled signal for ending a film-projecting interval and for initiating a tape-playing interval and means responsive to said tape-controlled signal for ending said tape-playing interval and for initiating a further film-projecting interval.

3. In combination, a tape recorder adapted to playback a tape and including a recorder motor for initiating a tape-playing interval and a recorder power supply for said tape recorder, a film projector adapted to project a film and including a projector motor for initiating a film-projecting interval and a projector power supply for said projector, tape-sensing means adapted to monitor said tape and providing tape-controlled signal, film-sensing means adapted to monitor said film and providing a film-controlled signal, a programming control responsive to said tape-controlled and film-controlled signals respectively for coordinating said tape-playing and film-projecting intervals, and means for setting said programming control for initiating control in response to one or the other of said tape-controlled and film-controlled signals.

4. An audio-visual presentation system comprising a tape-recorder, a magnetic tape having successive tape signal-producing means thereon, a recorder motor, a recorder energization circuit including a recorder power supply, and means responsive to said tape signal-producing means for providing a tape signal, a film projector, a film having successive film signal-producing means thereon, a projector motor, a projector energization circuit including a projector power supply, and means responsive to said film signal-producing means for providing a film signal, and a programming control including means responsive to said tape and film signals respectively for selectively completing said recorder and projector energization circuits, and means for applying a control power supply from one of said recorder and projector power supplies.

5. An audio-visual presentation system comprising a tape-recorder, a magnetic tape having successive tape signal-producing means thereon, a recorder motor, a recorder energization circuit including a recorder power supply, and means responsive to said tape signal-producing means for providing a tape signal; a film projector, a film having successive film signal-producing means thereon, a projector motor, a projector energization circuit including a projector power supply, and means responsive to said film signal-producing means for providing a film signal, and a programming control including means responsive to said tape and film signals reepectively for selectively completing said recorder and projector energization circuits, and respective means in said control for initially conditioning said control to start a control program in response to one or the other of said tape and film signals.

6. An audio-visual presentation system comprising a tape-recorder, a magnetic tape having successive tape signal-producing means thereon, a recorder motor, a recorder energization circuit including a recorder power supply, and means responsive to said tape signal-producing means for providing a tape signal, a film projector, a film having successive film signal-producing means thereon, a projector motor, a projector energization circuit including a projector power supply, and means responsive to said film signal-producing means for providing a film signal, and a programming control including means responsive to said tape and film signals respectively for selectively completing said recorder and projector energization circuits, means for applying a control power supply from one of said recorder and projector power supplies, and respective means in said control for initially conditioning said control to start a control program in response to one or the other of said tape and film signals.

7. In combination, a tape recorder adapted to playback a tape and including a recorder motor for initiating a tape-playing interval and a recorder power supply for said tape recorder, a film projector adapted to project a film and including a projector motor for initiating a film-projecting interval and a projector power supply for said projector, tape-sensing means adapted to monitor said tape and providing tape-controlled signal, film-sensing means adapted to monitor said film and providing a film-controlled signal, a programming control responsive to said tape-controlled and film-controlled signals respectively for coordinating said tape-playing and film-projecting intervals, said programming control including a bank of contacts including a first contact connected in an energization circuit for said recorder motor, a second contact connected in an energization circuit for said projector motor, a third contact over which tape-controlled signals are fed to said programming control, and a fourth contact over which film-controlled signals are fed to said programming control, and means for setting said bank of contacts in said programming control for initiating control in response to one or the other of said tape-controlled and film controlled signals.

8. In combination, a tape recorder adapted to playback a tape and including a recorder motor for initiating a tape-playing interval and a recorder power supply for said tape recorder, a film projector adapted to project a film and including a projector motor for initiating a film-projecting interval and a projector power supply for said projector, tape-sensing means adapted to monitor said tape and providing tape-controlled signal, film-sensing means adapted to monitor said film and providing a film-controlled signal, a programming control responsive to said tape-controlled and film-controlled signals respectively for coordinating said tape playing and film-projecting intervals, said programming control including a bank of contacts including a first contact connected in an energization circuit for said recorder motor, a second contact connected in an energization circuit for said projector motor, a third contact over which tape-controlled signals are fed to said programming control, and a fourth contact over which film-controlled signals are fed to said programming control, means for setting said bank of contacts in said programming control for initiating control in response to one or the other of said tape-controlled and film-controlled signals, said last-named means including opposed relay means for selectively setting said bank of contacts and respective push buttons for selectively energizing said relay means.

9. In combination, a tape recorder adapted to playback a tape and including a recorder motor for initiating a tape-playing interval and a recorder power supply for said tape recorder, a film projector adapted to project a film and including a projector motor for initiating a film-projecting interval and a projector power supply for said projector, tape-sensing means adapted to monitor said tape and providing tape-controlled signal, film-sensing means adapted to monitor said film and providing a film-controlled signal, a programming control responsive to said tape-controlled and film-controlled signals respectively for coordinating said tape-playing and film-projecting intervals, said programming control including a bank of contacts including a first contact connected in an energization circuit for said recorder motor, a second contact connected in an energization circuit for said projector motor, a third contact over which tape-controlled signals are fed to said programming control, and a fourth contact over which film-controlled signals are fed to said programming control, means for setting said bank of contacts in said programming control for initiating control in response to one or the other of said tape-controlled and film-controlled signals, and manually operable means for bypassing said second contact to provide a continuous energization circuit for said projector motor independent of the energization circuit provided over said second contact.

References Cited by the Examiner

UNITED STATES PATENTS

| | | | |
|---|---|---|---|
| 2,475,439 | 7/49 | Waller et al. | 88—28 X |
| 2,693,127 | 11/54 | Ortman | 88—16.2 |
| 2,847,513 | 8/58 | Schlafly. | |

NORTON ANSHER, *Primary Examiner.*

WILLIAM MISIEK, *Examiner.*